(No Model.) 2 Sheets—Sheet 1.
J. DE WITT.
PASSENGER VEHICLE.
No. 508,414. Patented Nov. 14, 1893.
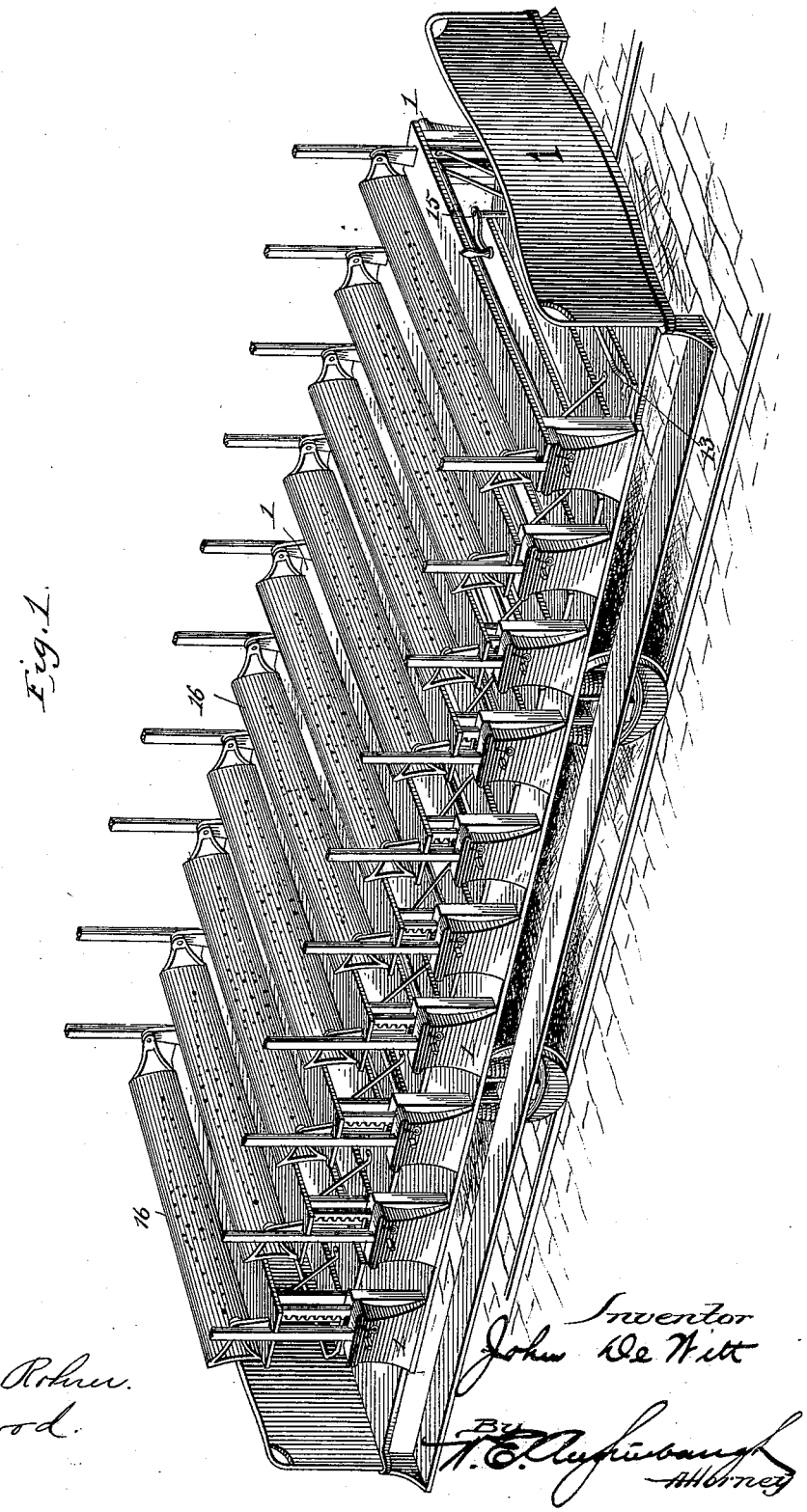

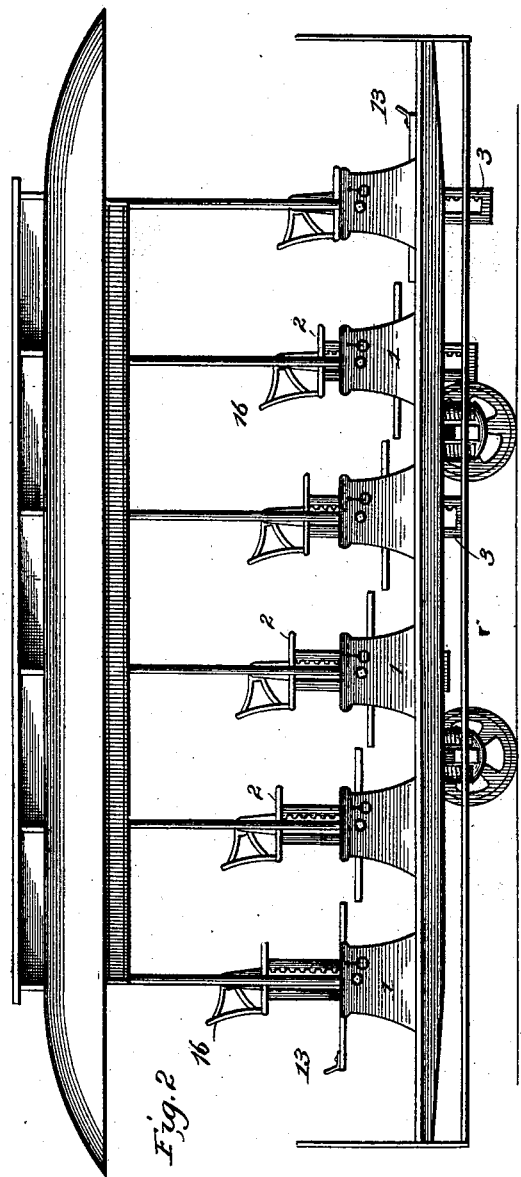
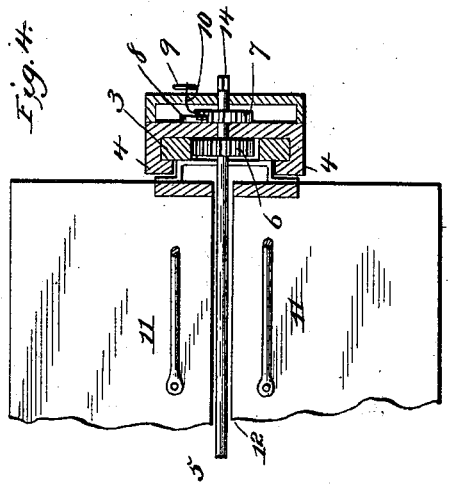
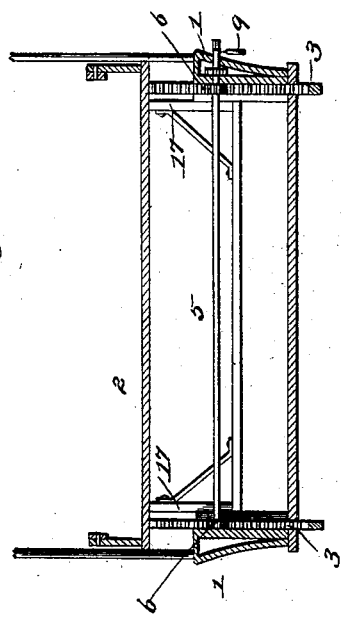

United States Patent Office.

JOHN DE WITT, OF WASHINGTON, DISTRICT OF COLUMBIA.

PASSENGER-VEHICLE.

SPECIFICATION forming part of Letters Patent No. 508,414, dated November 14, 1893.

Application filed January 3, 1893. Serial No. 457,029. (No model.)

*To all whom it may concern:*

Be it known that I, JOHN DE WITT, a citizen of the United States, and a resident of Washington, in the District of Columbia, have invented a certain new and useful Improvement in Passenger-Vehicles, of which the following is a description.

My invention relates to passenger conveyances, vehicles or vessels, and my object is to provide passenger carrying vehicles or vessels with a series of adjustable seats which may be so graduated as to afford those in the rear of the front seat unobstructed views of the country through which they may be passing.

In the drawings, Figure 1, is a perspective view of my invention the top of the car being removed. Fig. 2, is a side view of another car provided with my improvement. Fig. 3, is a cross sectional view showing the vertical racks and the pinions engaging them. Fig. 4, is a sectional plan view of my invention.

Referring to the drawings 1, 1, 1, designate the seat supports, each seat being provided with two of these supports, one at each end. Each seat 2, 2, has connected with it a means for vertically adjusting it, shown in the drawings as a rack bar working in guides 4, 4, secured to the inner faces of the seat supports 1, 1. Extending from one seat support to the other is a shaft 5, provided adjacent its opposite ends with pinions 6, 6, adapted to engage the rack 3. Near one end of each shaft is a ratchet wheel 7, adapted to be engaged by a pawl 8, to prevent reverse rotation of the shaft. Each shaft has a projecting end 14, fitted to receive a crank, which crank may be the brake handle 15. These seats may be operated at the same time from either platform by either a train of gear wheels or by a series of levers properly arranged. When it is desired to release the ratchet the pawl may be lifted by drawing on a ring 9 connected to the pawl by cord, wire or other suitable means 10. Connected with each set of rack bars so as to rise and fall therewith is a foot board 11, divided at 12, so as to allow it to pass the shaft 5 when being moved vertically. Each foot board may be provided with a foot rest 13, although this is not essential. Each seat is further provided with a reversible back rest 16, fastened to the continuation of the rack bar. Each seat proper is cut away at each end so as to readily slide upon the uprights which support the car top. Preferably the foot supports are connected with standards 17 by means of braces 18, said standards also aiding to support the seats 1, 1, 1.

The operation of my device is as follows: When it is desired to so arrange the seats as to graduate them in order that all the passengers may have an unobstructed view, the front seat is allowed to remain in its lowest position. The crank is applied to the end of the shaft 5 of the second seat and a few turns given thereto causes the pinions on the shaft to raise the rack and the seat connected therewith as high as desired, the pawl engaging the ratchet and preventing the racks from lowering. In the same order each of the rear seats is raised to the desired position, or the seats may be arranged as desired. By drawing upon the ring 9, the pawl 8 is disengaged and the racks and seats may be lowered. Where there is a turn table at each end of the route the seats may remain indefinitely in their adjusted positions. When it is desired to run the conveyances without turning them at the end of each trip the back rests may be reversed and the seats rearranged for the return trip.

It is obvious that instead of racks and pinions for adjusting the seats I may use screws for that purpose, or weights. Other adjusting devices may also be employed.

As is obvious the step shaped seats may be made stationary, thereby obviating the necessity of raising and lowering them at the end of each trip. Such a construction as this would be well adapted for use on roads provided with turn tables. It will be observed that the movable foot boards form a series of platforms which rise with each seat.

Having thus described my invention, what I claim as new, and desire to secure by Letters Patent, is—

1. A passenger conveyance having a series of vertically adjustable seats arranged in step-by-step order and provided each with a foot-rest.

2. A passenger conveyance provided with a series of vertically adjustable seats, each having a foot-rest connected therewith.

3. A passenger conveyance provided with a series of vertically adjustable seats, each having a vertically adjustable foot-rest connected therewith.

4. A vehicle provided with a double bottom, the upper one of which is divided into a series of platforms which rise and fall with the seats.

In testimony whereof I hereunto affix my signature in the presence of two witnesses.

JOHN DE WITT.

Witnesses:
W. E. AUGHINBAUGH,
C. M. YORK.